(12) United States Patent
Spencer

(10) Patent No.: US 11,009,108 B1
(45) Date of Patent: May 18, 2021

(54) PULLEY ASSEMBLY FOR LIQUID LEVEL GAUGING SYSTEM

(71) Applicant: Joshua Spencer, Round Rock, TX (US)

(72) Inventor: Joshua Spencer, Round Rock, TX (US)

( * ) Notice: Subject to any disclaimer, the term of this patent is extended or adjusted under 35 U.S.C. 154(b) by 0 days.

(21) Appl. No.: 15/863,959

(22) Filed: Jan. 7, 2018

Related U.S. Application Data

(60) Provisional application No. 62/444,186, filed on Jan. 9, 2017.

(51) Int. Cl.
| | |
|---|---|
| *F16H 19/00* | (2006.01) |
| *G01F 23/42* | (2006.01) |
| *F16H 19/06* | (2006.01) |
| *G01F 23/40* | (2006.01) |
| *F16H 19/02* | (2006.01) |

(52) U.S. Cl.
CPC ........... *F16H 19/003* (2013.01); *F16H 19/02* (2013.01); *F16H 19/06* (2013.01); *F16H 19/0622* (2013.01); *F16H 19/0645* (2013.01); *G01F 23/40* (2013.01); *G01F 23/42* (2013.01)

(58) Field of Classification Search
CPC .... G01F 23/42; G01F 23/40–46; F16H 19/06; F16H 19/0622; F16H 19/0645
See application file for complete search history.

(56) References Cited

U.S. PATENT DOCUMENTS 7,465,144 B1 * 12/2008 Studer ................... B60P 1/5442
414/541
7,971,395 B1 * 7/2011 Vigil ....................... E04G 11/48
52/6

* cited by examiner

*Primary Examiner* — Paul M. West
(74) *Attorney, Agent, or Firm* — Wayne J. Colton, Inc.

(57) ABSTRACT

A pulley assembly includes an elongate pulley hanger, supported at the upper end of a pillar rising from and dependently supported by a base bracket, and first and second pulleys slidingly supported by the pulley hanger. The base bracket securely mounts the pulley assembly to the top of a liquid storage tank. Each provided pulley implements, or is otherwise provided with, a clamp, whereby each pulley is readily positioned along the pulley hanger, and, when in a desired position, easily and securely fixed in the desired position.

8 Claims, 3 Drawing Sheets

US 11,009,108 B1

PULLEY ASSEMBLY FOR LIQUID LEVEL GAUGING SYSTEM

RELATED APPLICATION

This present application claims, under 35 U.S.C. § 119(e), all available benefit of, and priority to, U.S. provisional patent application Ser. No. 62/444,186 filed Jan. 9, 2017. By this reference, the full disclosure, including the drawings, of U.S. provisional patent application Ser. No. 62/444,186 is incorporated herein, as though now set forth in its entirety.

FIELD OF THE INVENTION

The present invention relates to material handling. More particularly, the invention relates to an improved pulley assembly for use in connection with a gauging system whereby the level of a liquid contained within a storage tank may be readily ascertained.

BACKGROUND OF THE INVENTION

U.S. Pat. No. 7,353,704 issued Apr. 8, 2008 to Clanton ("Clanton"), which is incorporated herein as though now set forth in its entirety, discloses the use of a cable guidance means in the provision of an external liquid level gauge, which enables the level of a liquid contained within a storage tank to be judged. Although the concept of using a pulley system to route a cable, attached at one end within the storage tank to a float and at the other end to a weight enclosed within a gauge tube affixed to an external side of the storage tank, is as broadly disclosed by Clanton meritorious, Applicant has found the disclosed cable guidance means to be lacking.

In particular, Applicant has in practice found that the cable guidance means as described by Clanton is difficult and time consuming to properly adjust, owing in at least some part to the placement of the pulleys within the interior space of the described encompassing frame members. Additionally, the cable guidance means as described by Clanton fails to ensure that the first and second pulleys align one with the other, thus often resulting in excessive wear on the cable and/or pulley wheels.

With the foregoing deficiencies of the prior art clearly in mind, it is an overriding to object of the present invention to provide an improved pulley assembly for use with a liquid level gauging system, in the broad manner of that otherwise described by Clanton, which improved pulley system does not suffer from the previously discussed shortcomings of the prior art.

Accordingly, it is a specific object of the present invention to provide such an improved pulley system that is easy to install, and readily adjustable to optimum performance.

Still further, it is an object of the present invention to provide such an improved pulley system that is less susceptible to component wear than is the prior art.

Finally, it is an object of the present invention to provide such an improved pulley system that is readily and economically manufactured, and therefore available for use across the widest range of applications.

SUMMARY OF THE INVENTION

In accordance with the foregoing objects, the present invention—a pulley assembly for use in connection with a liquid level gauging system—generally comprises an elongate pulley hanger, supported at the upper end of a pillar rising from and dependently supported by a base bracket, and first and second pulleys slidingly supported by the pulley hanger. The base bracket securely mounts the pulley assembly to the top of a liquid storage tank. Each provided pulley comprises, or is otherwise provided with, a clamp, whereby each pulley is readily positioned along the pulley hanger, and, when in a desired position, easily and securely fixed in the desired position.

The cooperative arrangement of each pulley and clamp with the pulley hanger serves to ensure that each pulley is at all times maintained in alignment with the other pulley, such that a cable running between the pulleys will always oriented perpendicularly to the rotational axis of the pulley sheave. In this manner, wear on the cable and/or sheaves is minimized, thereby greatly increasing the reliable lifetime of the liquid level gauging system of which the pulley assembly is integral part.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
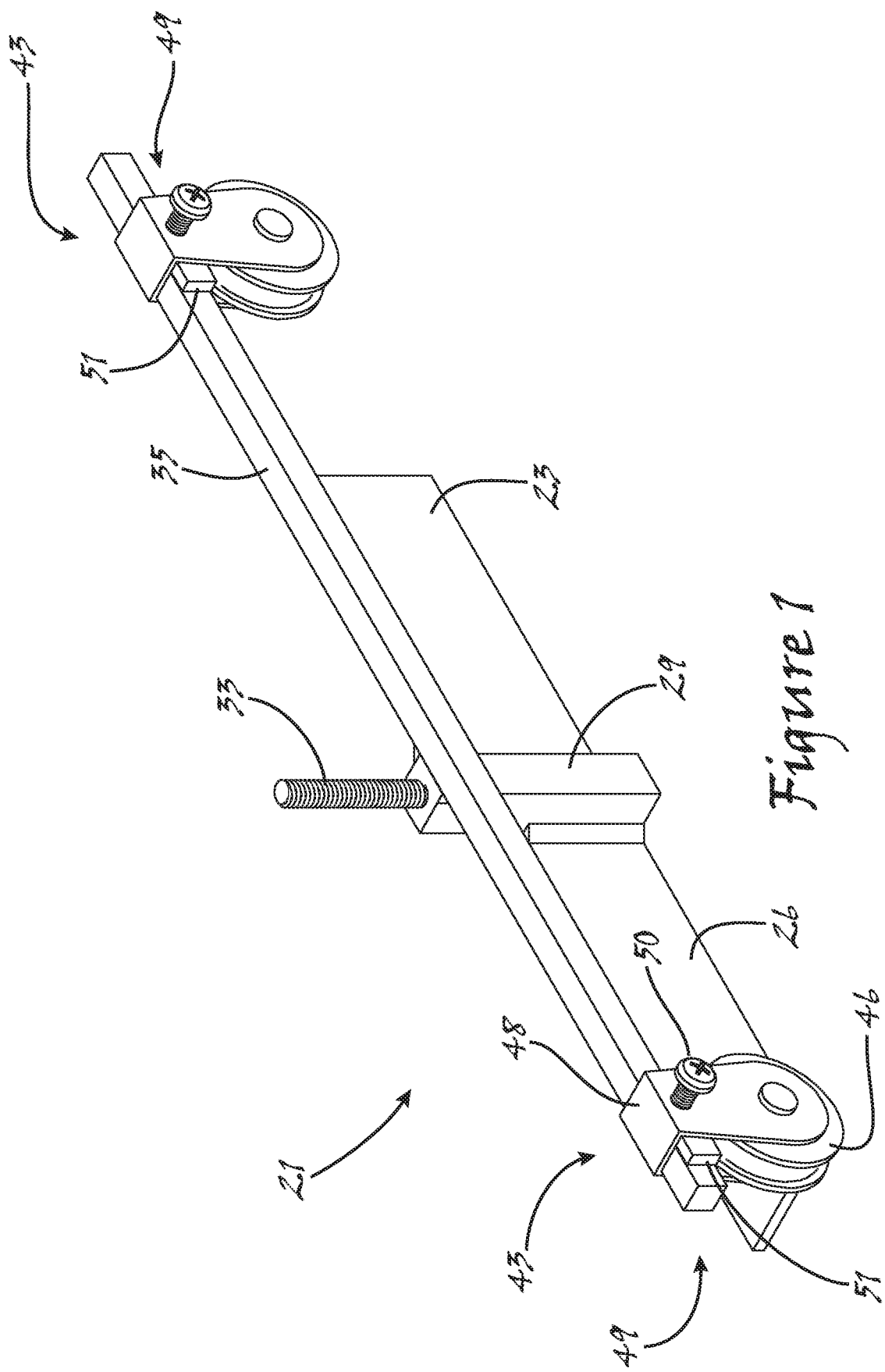
FIG. 1 shows, in a front isometric view, a preferred implementation of the pulley assembly of the present invention, as assembled for use as an integral part of a liquid level gauging system.

Referring now to the figures, and to FIG. 1 in particular, a preferred implementation of the pulley assembly 21 of the present invention is shown to generally comprise an elongate pulley hanger 35, which is dependently supported at the upper end of a pillar 29, which rises from, and is dependently supported by, a base bracket 23, and first and second pulleys 43 slidingly supported by the pulley hanger 35. The base bracket 23 is adapted to securely mount the pulley assembly 21 to the top of a liquid storage tank, and, to this end, is provided with a plurality of tank mounting holes 25, as particularly shown in FIG. 4. As will be better understood further herein, each provided pulley 35 comprises, or is otherwise provided with, a clamp 49, whereby each pulley 43 is readily positioned along the pulley hanger 35, and, when in a desired position, easily and securely fixed in the desired position. Additionally, the disclosed cooperative arrangement of each pulley 43 and clamp 49 with the pulley hanger 35 serves to ensure that each pulley 43 is at all times maintained in alignment with the other pulley 43, such that a cable running between the pulleys 43 will always oriented perpendicularly to the rotational axis of the pulley sheave 46. In this manner, wear on the cable and/or sheaves 46 is minimized, thereby greatly increasing the reliable lifetime of the liquid level gauging system of which the pulley assembly 21 is an integral part.

Figure 2:
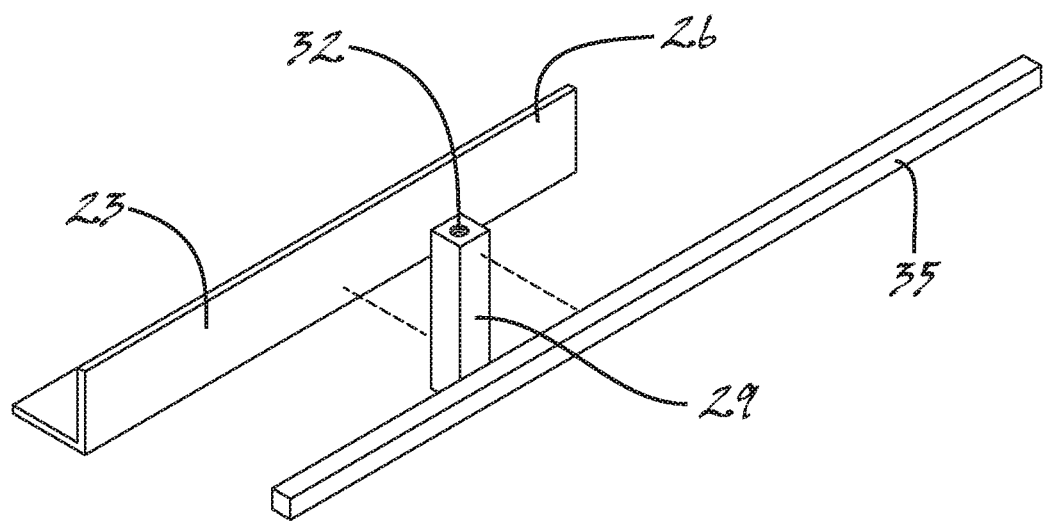
FIG. 2 shows, in an exploded, front isometric view, the arrangement of various to components forming a hanger weldment of the pulley assembly of FIG. 1.

As particularly shown in FIG. 2, the base bracket 23 is readily constructed from otherwise conventional angle iron. Although other materials may be suitable, Applicant has found it preferable to implement the base bracket 23 with SAE 304 stainless steel, which, due to the presence of molybdenum, provides a much higher degree of corrosion resistance than other grades of stainless steel. In any case, and as is also shown in FIG. 2, the pillar 29 is readily constructed from a short segment of square bar, and, similarly, the pulley hanger 35 is readily constructed from an elongate length of square bar. As with the base bracket 23, the pillar 29 and the pulley hanger 35 are also most preferably implemented with SAE 304 stainless steel. Finally, a threaded hole 32 is provided in the top face of the pillar 29, which, as will be better understood further herein, dependently supports an upwardly projecting all thread 33 useful for securing a cover over and about the pulley assembly 21.

Figure 3:
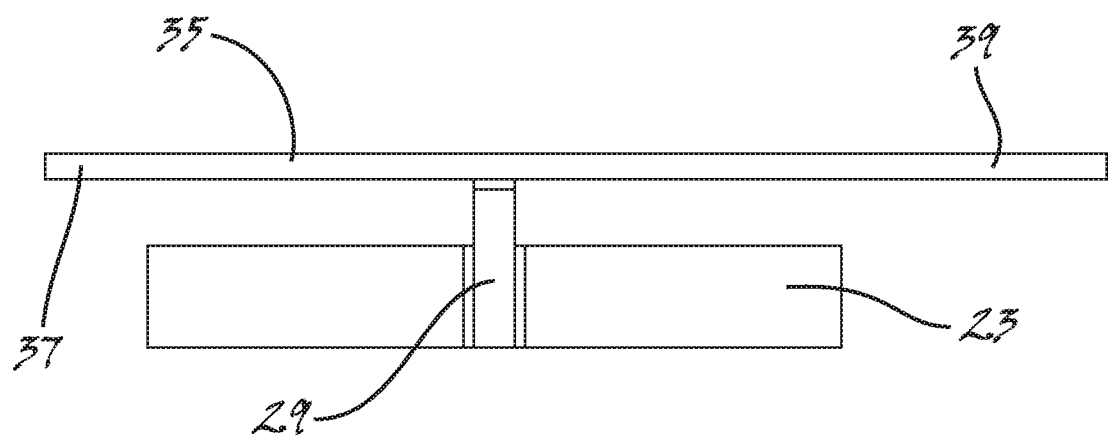
FIG. 3 shows, in a front elevational view, various details of the hanger weldment of FIG. 2.
Figure 4:
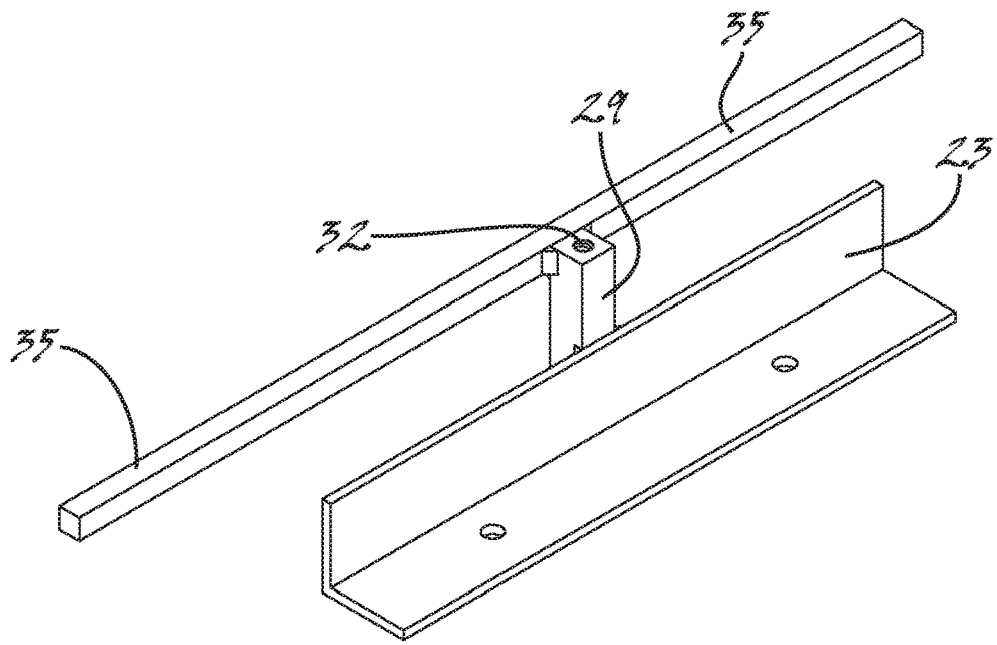
FIG. 4 shows, in an isometric view, various additional details of the hanger weldment of FIG. 2.

As shown in FIGS. 3 and 4, the base bracket 23, pillar 29 and pulley hanger 35 are most preferably assembled as a hanger weldment 22. To this end, and as shown in the figures, the lower portion of the pillar 29 is welded to the central region of the front face of the vertical leg 26 of the base bracket 23. Similarly, the rear face of the pulley hanger 35 is welded to the upper end of the pillar 29. Of note, however, and as best shown in FIG. 3, the pulley hanger 35 is most preferably welded to the pillar 29 such that the first end 37 of the of the pulley hanger 35 extends a distance to about the corresponding edge of the base bracket 23, while the second end 39 of the of the pulley hanger 35 extends to a distance substantially beyond the corresponding edge of the base bracket 23. In this manner, a pulley 43 supported at the second end 39 of the pulley hanger 35 is readily positioned beyond the top of the liquid storage tank and directly over a liquid level indicator dependently attached to an external side wall of the liquid storage tank.

Figure 5:
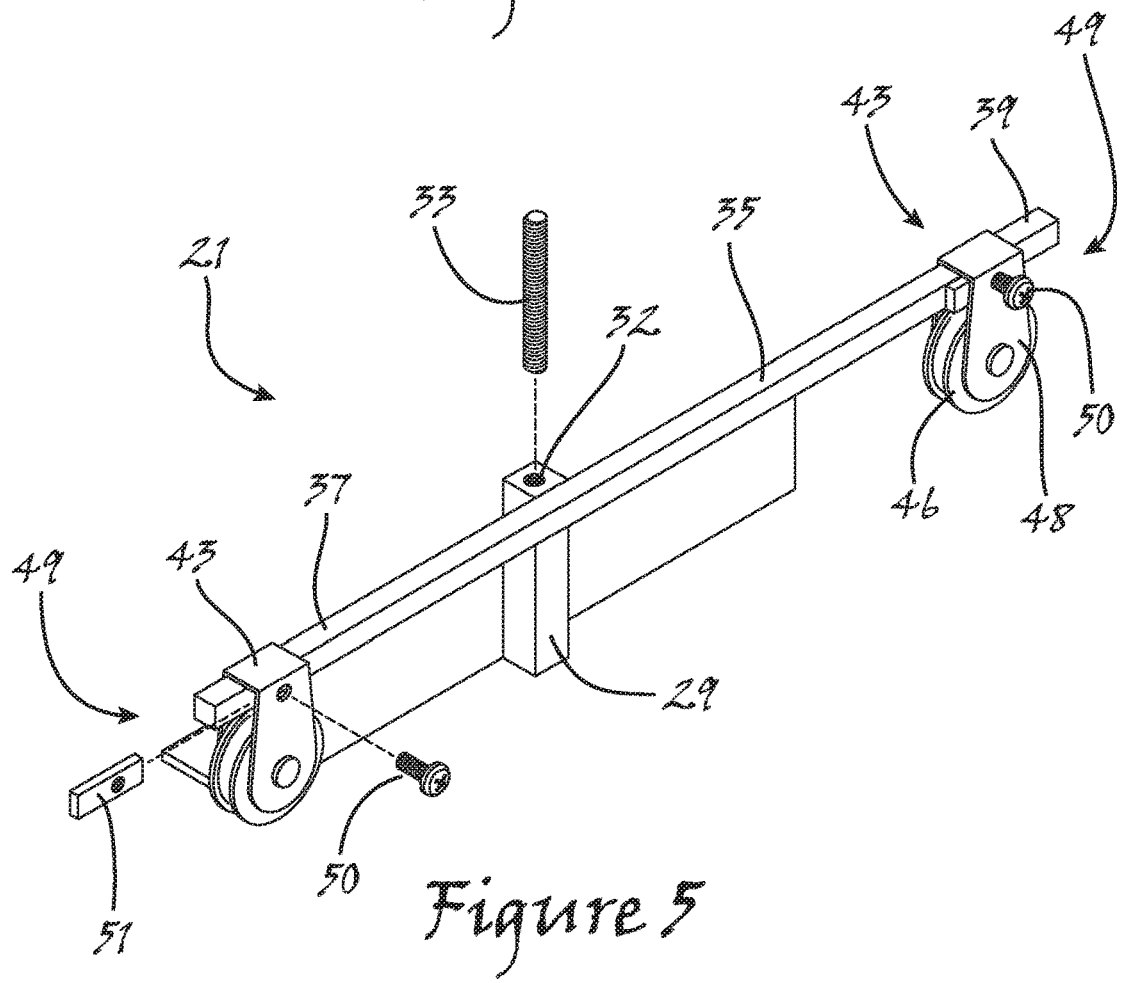
FIG. 5 shows, in a partially exploded, front isometric view generally corresponding to the view of FIG. 1, various details of the components and assembly thereof of the pulley assembly of FIG. 1.

Turning now to FIG. 5, the assembly for use of the pulley assembly 21 is detailed. As shown in the figure, and as previously mentioned, an all thread 33 screws part way into threaded hole 32 provided at the top face of the pillar 29. When inserted, as shown in FIG. 1, the all thread 33 provides a mounting and securing means for a cover for the pulley assembly 21.

As also shown in FIGS. 1 and 5, a first pulley 43 is slidingly supported at the first end of the pulley hanger 35 and a second pulley 43 is slidingly supported at the second to end of the pulley hanger 35. In an important aspect of the present invention, Applicant has found it desirable for the pulleys 43 to be manufactured of SAE 304 stainless steel, with the exception of the sheaves 46, which should be manufactured of polyamide, also known as nylon, in order to prevent premature wear of the sheaves 46 and/or cable in the expected environment. In any case, and in a critical aspect of the present invention, each pulley 43 comprises, or is otherwise provided with, a clamp 49 for facilitating initial placement or later adjustment of the pulley 43, as well as for securely fixing the pulley 43 in a desired location along the pulley hanger 35.

Although many other implementations of the required clamp 43 are possible in light of this exemplary description, Applicant has found that a simple and suitable clamp may be implemented utilizing a side mount type pulley bracket 48, as shown in the figures, which is sized and shaped to fit over and about the pulley hanger 35 such that a small gap remains between the one side face of the pulley hanger 35 and an inside face of the pulley bracket 48, as is particularly shown in the FIG. 5. A nut 51, which may be of conventional manufacture or may be specially formed as shown in the figures to facilitate use as described, is then inserted into the gap between the pulley hanger 35 and the pulley bracket 48. A machine screw 50 or the like is then inserted through a hole in the side of the pulley bracket 48 and threaded into and through the nut 51, and into contact with the side face of the pulley hanger 35. With the nut 51 held against rotation, the continued turning of the machine screw 50 will cause the nut 51 to press against the adjacent inside face of the pulley bracket 48, thereby causing the opposite inside face of the pulley bracket 48 to clamp securely against the opposite face of the pulley hanger 35.

In use, the pulley assembly 21 is attached to the top of a liquid storage tank, with a cable routed through the pulleys 43, where the cable is attached at one end within the storage tank to a float and at the other end to a weight enclosed within a gauge tube affixed to an external side of the storage tank, as broadly disclosed by Clanton. Unlike the system of Clanton, however, the pulley assembly 21 of the present invention enables much easier and accurate adjustment of the pulleys. Once adjusted, it can be expected that a liquid level gauging system implanting the pulley assembly 21 of the present invention will provide accurate and maintenance free liquid level readings over greatly extended times.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. In any case, because the scope of the present invention is much broader than any particular embodiment, the foregoing detailed description should not be construed as a limitation of the scope of the present invention, which is limited only by the claims appended hereto.

What is claimed is:

1. A pulley assembly for use in connection with a liquid level gauging system, said pulley assembly comprising:
   a base bracket adapted to be securely mounted atop a liquid storage tank;
   a pillar, having an upper end and a base end, rising at said base end from, and dependently supported by, said a base bracket;
   an elongate pulley hanger dependently fixed to said upper end of said pillar;
   a first pulley and a second pulley; and
   wherein each said pulley is:
      slidingly supported by said pulley hanger; and
      provided with a clamp, whereby each said pulley is readily positioned along said pulley hanger, and, when in a desired position, securely fixed in the desired position.

2. The pulley assembly for use in connection with a liquid level gauging system as recited in claim 1, wherein at least one said pulley comprises said clamp provided with said one pulley.

3. The pulley assembly for use in connection with a liquid level gauging system as recited in claim 2, wherein each said pulley comprises said clamp provided with said pulley.

4. The pulley assembly for use in connection with a liquid level gauging system as recited in claim 1, wherein said elongate pulley hanger comprises a substantially square bar.

5. The pulley assembly for use in connection with a liquid level gauging system as recited in claim 1, wherein said pillar comprises a threaded hole in a top face thereof.

6. The pulley assembly for use in connection with a liquid level gauging system as recited in claim 1, wherein:
 said base bracket comprises a first end and a second end;
 said elongate pulley hanger comprises a first end, corresponding to said first end of said base bracket, and a second end, corresponding to said second end of said base bracket; and
 said first end of said elongate pulley hanger extends to a distance substantially even with said first end of said base bracket, and said second end of said elongate pulley hanger extends to a distance substantially beyond said second end of said base bracket.

7. The pulley assembly for use in connection with a liquid level gauging system as recited in claim 1, wherein said elongate pulley hanger is welded to said upper end of said pillar.

8. The pulley assembly for use in connection with a liquid level gauging system as recited in claim 1, wherein each said pulley is aligned one to the other such that a cable running between said pulleys will be oriented perpendicular to the respective rotational axis of each said pulley.

\* \* \* \* \*